(12) United States Patent
Hsiao

(10) Patent No.: US 12,405,183 B2
(45) Date of Patent: Sep. 2, 2025

(54) ADJUSTMENT DEVICE FOR TORQUE WRENCH

(71) Applicant: Fang-Wei Hsiao, Taichung (TW)

(72) Inventor: Chieh-Jen Hsiao, Taichung (TW)

(73) Assignee: Fang-Wei Hsiao, Taichung (TW)

( * ) Notice: Subject to any disclaimer, the term of this patent is extended or adjusted under 35 U.S.C. 154(b) by 288 days.

(21) Appl. No.: 18/449,424

(22) Filed: Aug. 14, 2023

(65) Prior Publication Data
US 2024/0068899 A1 Feb. 29, 2024

(30) Foreign Application Priority Data
Aug. 24, 2022 (TW) .................................. 111131882

(51) Int. Cl.
*G01L 25/00* (2006.01)
*B25B 23/142* (2006.01)

(52) U.S. Cl.
CPC ........ *G01L 25/003* (2013.01); *B25B 23/1427* (2013.01)

(58) Field of Classification Search
CPC ........................... G01L 25/003; B25B 23/1427
See application file for complete search history.

(56) References Cited

U.S. PATENT DOCUMENTS

| 2009/0222222 A1* | 9/2009 | Lucke | G01L 25/003 702/41 |
| 2024/0286254 A1* | 8/2024 | Chen | B25B 21/026 |

\* cited by examiner

*Primary Examiner* — Tarun Sinha
(74) *Attorney, Agent, or Firm* — Burris Law, PLLC

(57) ABSTRACT

An adjustment device for adjusting a torque of a torque wrench includes a base unit, a driving unit, and a control unit. The torque wrench includes a shank body extending along an axis, an adjusting unit threadedly engaging the shank body, and a resilient member abutting against the adjusting unit. The base unit is for mounting of the torque wrench. The driving unit includes a coupling member removably connected to the adjusting unit, and a driving motor. The control unit controls the driving motor to drive rotation of the coupling member about the axis for driving rotation of the adjusting unit to thereby move the adjusting unit along the axis to vary a preload force of the resilient member and thus a torque of the torque wrench and to move the adjusting unit to a position where the torque of the torque wrench corresponds to a predetermined torque value.

9 Claims, 6 Drawing Sheets

ADJUSTMENT DEVICE FOR TORQUE WRENCH

CROSS-REFERENCE TO RELATED APPLICATION

This application claims priority to Taiwanese Invention Patent Application No. 111131882, filed on Aug. 24, 2022.

FIELD

The disclosure relates to an adjustment device, and more particularly to an adjustment device for a torque wrench.

BACKGROUND

A conventional adjustment device is provided for calibrating a torque of a torque wrench. The torque wrench includes a shank body, a torsion head mounted on one end of the shank body, a handle threadedly engaging the other end of the shank body, and a spring disposed in the shank body, and clamped between and abutting against the torsion head and the handle.

The conventional adjustment device includes a base for mounting of the torque wrench, two limiting members extending upwardly from the base and for clamping the shank body, a torque device mounted on the base, a display, and a computer electrically connected to the torque device and the display. The torque device includes a rotating member that is rotatable and that co-rotatably engages the torsion head of the torque wrench, a motor that is electrically connected to the computer to be controlled thereby and that is operable for driving rotation of the rotating member, and a torque sensor that measures the torque exerted by the rotating member and that is electrically connected to the computer to transmit a measuring result thereto.

When it is desired to calibrate the torque of the torque wrench, the handle is first rotated so the handle is moved relative to the shank body to compress or to release the spring, and thus the torque of the torque wrench is adjusted to correspond to a predetermined torque value. Then, the torsion head of the torque wrench is brought to engage the rotating member, the shank body is placed to be clamped between the limiting members, and the computer is operated to control the motor to drive rotation of the rotating member and thus the torque head. The torque sensor measures a peak torque value exerted by the rotating member when the torque exerted by the rotating member is greater than an actual torque value of the torque wrench, which is provided by the spring. When a difference between the peak torque value and the predetermined torque value is greater than a tolerance, the spring is to be replaced by another spring having an elasticity coefficient different from that of the original spring according to magnitude of the difference. Hereafter, the abovementioned operations are repeated until the difference is smaller than the tolerance. For example, in a case where a torque wrench is supposed to have a predetermined torque value equal to 40 Newton metre (Nm), and the peak torque value obtained from the torque sensor is 41 Nm, which represents that the actual torque value of the torque wrench is greater than the predetermined torque value. Therefore, the original spring is to be replaced by another spring with an elastic coefficient smaller than that of the original spring, until the peak torque value is substantially equal to the predetermined torque value, i.e., 40 Nm.

However, the abovementioned operation conducted by the conventional adjustment device is a trial-and-error method. It is troublesome to manually rotate the handle, to measure the peak torque value, and to replace the spring. Thus, calibration performed by the conventional adjustment device is not only time-consuming but also labor-intensive.

SUMMARY

Therefore, an object of the disclosure is to provide an adjustment device and that can alleviate at least one of the drawbacks of the prior art.

According to an aspect of the disclosure, an adjustment device for adjusting a torque of a torque wrench is provided. The torque wrench includes a shank body that extends along an axis and that defines an accommodating space therein, a torsion member and an adjusting unit that are disposed at two opposite ends of the shank body along the axis, and a resilient member that is disposed in the accommodating space and clamped between the torsion member and the adjusting unit. The adjusting unit threadedly engages the shank body, and is rotatable about the axis so as to be movable relative to the shank body along the axis to vary a preload force of the resilient member and thus a torque of the torque wrench. The adjustment device includes a base unit, a driving unit, and a control unit. The base unit includes a frame seat adapted for mounting of the torque wrench thereon, and a positioning member disposed on the frame seat and adapted for positioning the shank body. The driving unit includes a coupling member adapted to be removably connected to the adjusting unit, and a driving motor mounted movably to the frame seat, and operable for driving the coupling member to rotate about the axis for driving the adjusting unit to rotate about the axis. The control unit is electrically connected to the driving motor, and is configured to control the driving motor to drive rotation of the coupling member about the axis for driving rotation of the adjusting unit to thereby move the adjusting unit along the axis to a position where the torque of the torque wrench corresponds to a predetermined torque value.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
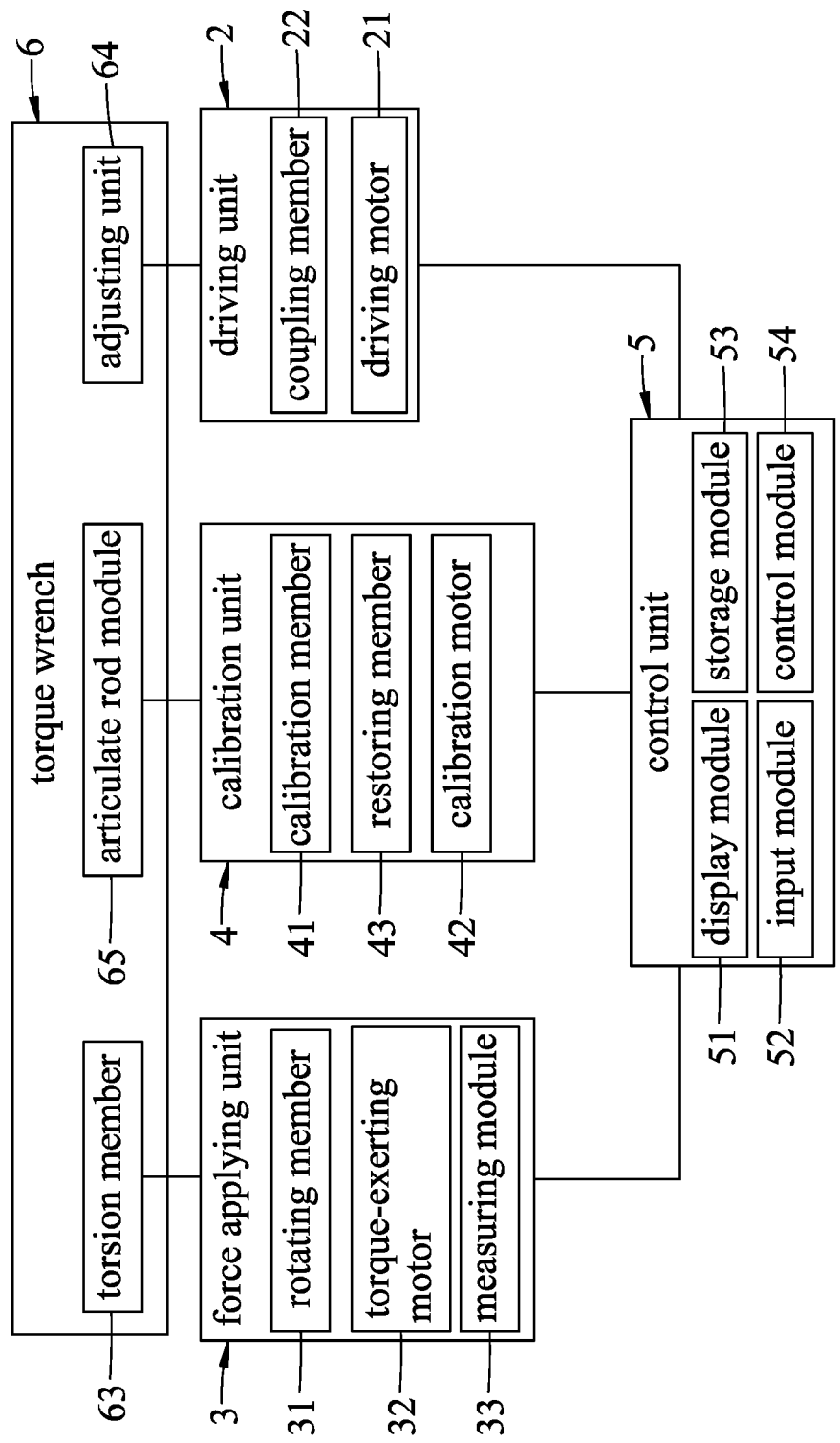
FIG. 1 is a block diagram of an adjustment device of a first embodiment according to the present disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
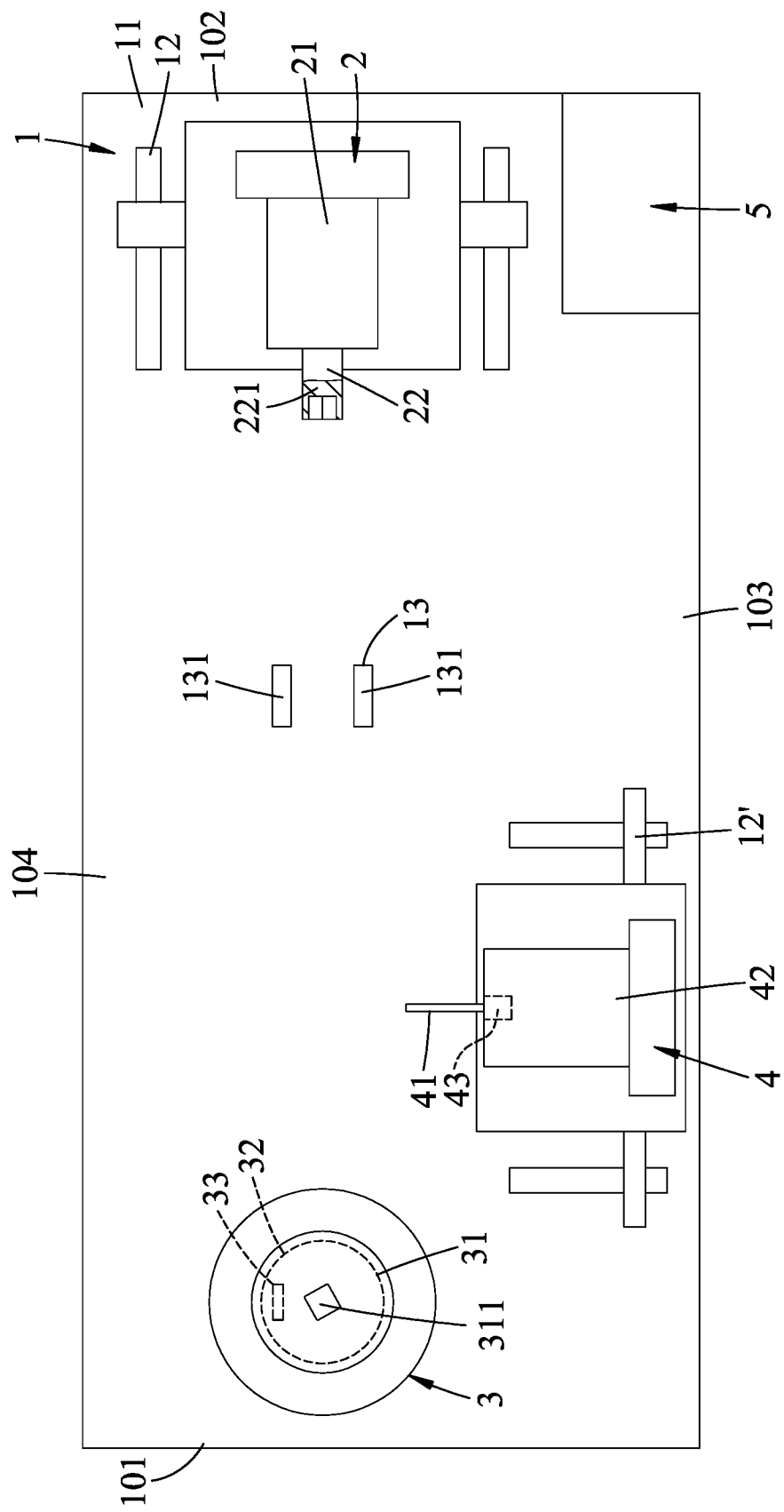
FIG. 2 is a schematic top view of the first embodiment.
Figure 3:
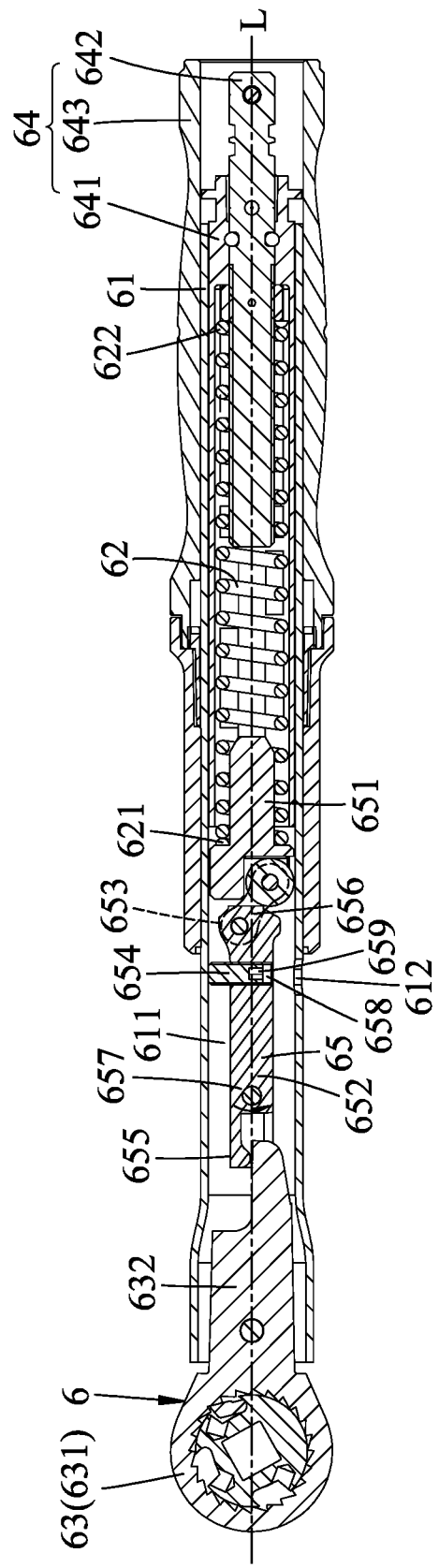
FIG. 3 is a sectional view of a torque wrench to be adjusted by the first embodiment.

Referring to FIGS. 1 to 3, an adjustment device of a first embodiment according to the present disclosure is for adjusting a torque of a torque wrench 6. The torque wrench 6 includes a shank body 61, a resilient member 62, a torsion member 63, an adjusting unit 64, and an articulate rod module 65. The shank body 61 is hollow, extends along an axis (L), and defines an accommodating space 611 therein. The resilient member 62 is disposed in the accommodating space 611 and is clamped between the torsion member 63 and the adjusting unit 64. The adjusting unit 64 threadedly engages the shank body 61, and is rotatable about the axis (L) so as to be movable relative to the shank body 61 along the axis (L) to vary a preload force of the resilient member 62 and thus a torque of the torque wrench 6.

The adjustment device includes a base unit 1, a driving unit 2, a force applying unit 3, a calibration unit 4, and a control unit 5.

The base unit 1 includes a frame seat 11, two sliding rail sets 12, 12' disposed on the frame seat 11, and a positioning member 13 including two clamping portions 131 that are disposed on the frame seat 11. The frame seat 11 has a front side 101, a rear side 102 opposite to the front side 101, a left side 103 interconnecting the front side 101 and the rear side 102, and a right side 104 opposite to the left side 103 and interconnecting the front side 101 and the rear side 102.

In this embodiment, the sliding rail sets 12, 12' are mounted respectively adjacent to the rear side 102 and the left side 103 of the frame seat 11.

The driving unit 2 includes a driving motor 21 and a coupling member 22. The coupling member 22 includes a sleeve 221, and is adapted to be removably connected to the adjusting unit 64. The driving motor 21 is mounted movably to the frame seat 11, is disposed between one of the sliding rail sets 12 adjacent to the rear side 102 of the frame seat 11, and is operable for driving the coupling member 22 to rotate about the axis (L) for driving the adjusting unit 64 to rotate about the axis (L).

The force applying unit 3 includes a rotating member 31, a torque-exerting motor 32, and a measuring module 33. The rotating member 31 is rotatably mounted adjacent to the front side 101 on the frame seat 11, is disposed opposite to the driving motor 21, and is adapted for engaging the torsion member 63 and exerting a torque on the torsion member 63 to drive rotation of the torsion member 63. In this embodiment, the rotating member 31 has a recess 311 that is adapted for engaging the torsion member 63. The torque-exerting motor 32 is mounted on the frame seat 11 for driving rotation of the rotating member 31. The measuring module 33 is mounted to the rotating member 31, and is configured to measure a peak torque value exerted by the rotating member 31 when the value of the torque exerted by the rotating member 31 is greater than an actual torque value of the torque wrench 6. It should be noted that in this embodiment, the torque-exerting motor 32 and the measuring module 33 are mounted under the frame seat 11 and are depicted by dashed lines in the drawings.

The calibration unit 4 includes a calibration member 41, a calibration motor 42, and a restoring member 43. The calibration member 41 is disposed between the other one of the sliding set 12' on the frame seat 11, and is adapted to extend into a calibration hole 612 that is formed in the shank body 61 and that is in spatial communication with the accommodating space 611. The calibration member 41 is further adapted to be connected to the articulate rod module 65 of the torque wrench 6. The calibrating motor 42 is disposed on the frame seat 11, is electrically connected to the control unit 5, and is operable for driving rotation of the calibration member 41. The restoring member 43 is connected between the calibration member 41 and the calibration motor 42 for resiliently biasing the calibrating member 41 away from the calibrating motor 42. In this embodiment, the restoring member 43 is made of an elastic material, and biases the calibration member 41 away from the calibration motor 42 so as to be exposed outwardly of the calibration motor 42. In this way, the calibration member 41 is movable relative to the calibration motor 42 in a resilient manner.

In this embodiment, the calibration member 41 has one end that is opposite to the calibration motor 42 and that is hexagonal. In other variations of the present disclosure, the end of the calibration member 41 may be a flat head, a cross head or have other configurations, and the present disclosure is not limited hereto.

The control unit 5 includes a display module 51, an input module 52, a storage module 53, and a control module 54. The storage module 53 of the control unit 5 stores a plurality of setting torque values. It should be noted that, prior to adjusting a torque of the torque wrench 6, a plurality of to-be-measured torque values may be inputted by a user via the input module 52 so as to be stored in the storage module 53 and respectively serve as the setting torque values. The control module 54 is electrically connected to the measuring module 33, the torque-exerting motor 32, the driving motor 21, the display module 51, the input module 52, and the storage module 53. The control module 54 is further configured to receive the peak torque value from the measuring module 33 and transmit the same to be stored in the storage module 53. The control module 54 is configured to control operations of the driving motor 21, the torque-exerting motor 32, and the calibration motor 42. Specifically, the control module 54 drives rotation of the driving motor 21 to drive rotation of the coupling member 22 about the axis (L) for driving rotation of the adjusting unit 64 to thereby move the adjusting unit 64 along the axis (L) to a position where the torque of the torque wrench 6 corresponds to a predetermined torque value. In this embodiment, the display module 51 is a screen, and the input module 52 is a keyboard, and other display modules and input modules may be used in other embodiments of the present disclosure. It should be noted that the control module 54 includes a microcontroller or a controller such as, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

As shown in FIG. 3, the resilient member 62 has a head end 621, and a tail end 622 opposite to the head end 621 along the axis (L). In this embodiment, the resilient member 62 is a spring.

The torsion member 63 and the adjusting unit 64 are disposed at two opposite ends of the shank body 61 along the axis (L). The torsion member 63 has a head portion 631, and a body portion 632 connected to the head portion 631, extending into the accommodating space 611, and connected pivotably to the shank body 61. The adjusting unit 64 includes an abutment portion 641, a polygonal rod 642, and a handle portion 643. The abutment portion 641 threadedly engages the shank body 61, abuts against the tail end 622 of the resilient member 62, and is co-rotatably connected to and abuts against the polygonal rod 642 at an end thereof opposite to the resilient member 62. The handle portion 643 is sleeved movably on the shank body 61, and is detachably connected to the abutment portion 641. The polygonal rod 642 extends into the tail end 622 of the resilient member 62, and is driven by the driving motor 21 to drive rotation of the abutment portion 641 to move the abutment portion 641 along the axis (L).

The head end 621 of the resilient member 62 is connected to and abuts against the articulate rod module 65, and the tail end 622 of the resilient member 62 abuts against the abutment portion 641 of the adjusting unit 64. In this way, the resilient member 62 is compressed and released during rotation of the adjusting unit 64 about the axis (L) and thus movement of the adjusting unit 64 along the axis (L) relative to the shank body 61.

In this embodiment, a length of the articulate rod module 65 along the axis (L) is adjustable so as to fine tune the preload force of the resilient member 62 and thus the torque of the torque wrench 6. It should be noted that, in other embodiments of the present disclosure, the articulate rod module 65 may be replaced by a slidable structure (not shown) that is movable relative to the shank body 61 along the axis (L) and that directly engages the resilient member 62, such that the resilient member 62 is resiliently clamped between the torsion member 63 and the adjusting unit 64, and the preload force thereof may also be adjusted when the slidable structure moves along the axis (L). In this embodiment, the articulate rod module 65 is disposed in the accommodating space 611, is pivotably connected to the torsion member 63, and includes a slidable block 651, a first link rod 652, a second link rod 653, and a threaded rod 654. The slidable block 651 abuts against the head end 621 of the resilient member 62. The first link rod 652 has a first end portion 655 abutting against the body portion 632 of the torsion member 63, a second end portion 656 opposite to the first end portion 655, a pivot connecting portion 657 located between the first end portion 655 and the second end portion 656 and pivotably connected to the shank body 61 via a pin, and a threaded hole 658 formed between the pivot connecting portion 657 and the second end portion 656 and extending transverse to the axis (L). Two opposite ends of the second link rod 653 are pivotably and respectively connected to the second end portion 656 and the slidable block 651. The threaded rod 654 extends through and threadedly engages the threaded hole 658, and has first and second ends opposite in a direction transverse to the axis (L). The first end of the threaded rod 654 is disposed adjacent to the shank body 61, and the second end of the threaded rod 654 is formed with an engaging hole 659 facing the calibration hole 612. When the slidable block 651 is biased by the resilient member 62 to push the second link rod 653 along the axis (L) via one of the ends of the second link rod 653 that is pivotably connected thereto, the other one of the ends of the second link rod 653 that is pivotably connected to the second end portion 656 of the first link rod 652 moves the first end of the threaded rod 654 to press against the shank body 61. An arrow shown in FIG. 3 depicts a direction of torque being exerted on the first link rod 652.

The engaging hole 659 is an internal hexagonal hole being engaged with and co-rotatable with the calibration member 41. It should be noted that the shape of the engaging hole 659 may be modified as long as the engaging hole 659 may be engaged with and co-rotatable with the calibration member 41, and the present disclosure is not limited to the configuration of the engaging hole 659.

When the calibration rod 41 is driven by the calibration motor 42 to rotate, the threaded rod 654 is co-rotatable therewith through engagement between the engaging hole 659 and the calibration rod 41. Specifically, the calibration rod 41 is rotatable in a first rotational direction for expanding the articulate rod module 65 to compress the resilient member 62, and is rotatable in a second rotational direction opposite to the first rotational direction for shrinking the articulate rod module 65 to release the resilient member 62, thereby varying the preload force of the resilient member 62. In this embodiment, when the threaded rod 654 is rotated by the calibration rod 41 in the first rotational direction, the threaded rod 654 abuts against the shank body 61 and the first link rod 652 pivots relative to the second link rod 653, and is moved in a direction depicted by the arrow shown in FIG. 4, such that an angle between the first link rod 652 and the second link rod 653 is increased to push the slidable block 651 toward the resilient member 62 and thus the articulate rod module 65 expands to compress the resilient member 62 along the axis (L). On the other hand, when the threaded rod 654 is rotated by the calibration rod 41 in the second rotational direction, the threaded rod 654 still abuts against the shank body 61 and the first link rod 652 pivots relative to the second link rod 654, and is moved in a direction depicted by an arrow shown in FIG. 3, such that an angle between the first link rod 652 and the second link rod 653 is decreased and the slidable block 651 is moved by the second link rod 653 away from resilient member 62 and thus the articulate rod module 65 is shrunk to release the resilient member 62. In this way, the preload force of the resilient member 62 is adjusted and thus the torque of the torque wrench 6 may be finely tuned by rotation of the calibration member 41 via the threaded rod 654 without rotating the handle 643. In this embodiment, the first rotational direction is a clockwise direction of the threaded rod 654 relative to the first link rod 652 in FIG. 3, while the second rotational direction is a counterclockwise direction of the threaded rod 654 relative to the first link rod 652 in FIG. 3.

In this embodiment, the output torque value of the torque wrench 6 ranges from 20 Nm to 100 Nm, but is not limited thereto.

Figure 4:
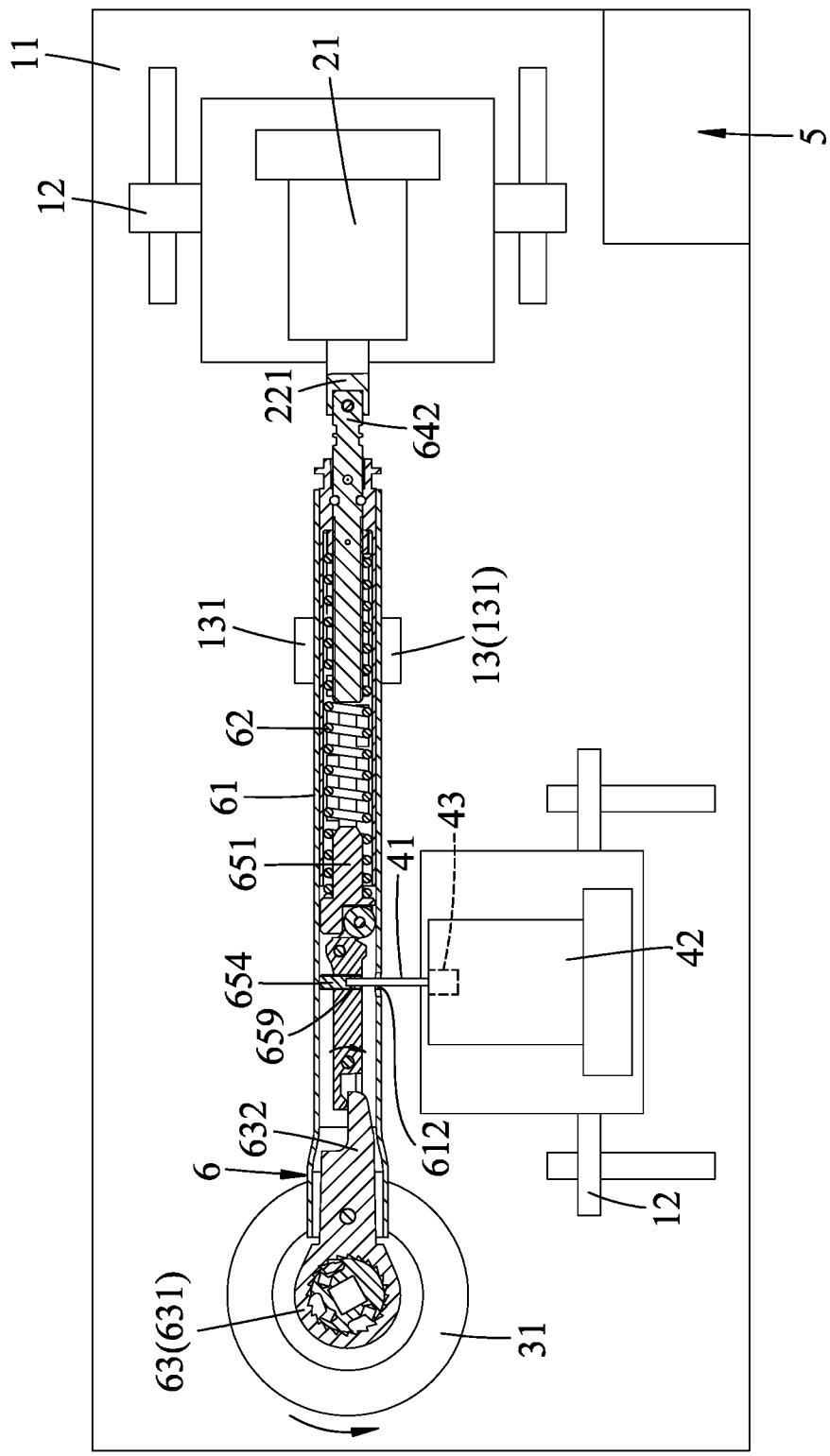
FIG. 4 is a schematic view illustrating the torque wrench being mounted to a base unit of the adjustment device of the first embodiment.

As shown in FIGS. 3 and 4, steps of mounting the torque wrench 6 on the frame seat 11 of the base unit 1 are described in the following. First, the handle 643 of the adjusting unit 64 is removed from the shank body 61, and the remaining portion of the torque wrench 6 is disposed on the frame seat 11 so that the clamping portions 131 of the positioning member 13 clamp the shank body 61 therebetween. In this embodiment, the clamping portions 131 are adapted to clamp diametrically opposite sides of the shank body 61. The recess 311 of the rotating member 31 of the force applying unit 3 is adapted for engaging the head portion 631 of the torsion member 63 and exerting a torque on the torsion member 63 to drive rotation of the torsion member 63. The sleeve 221 of the coupling member 22 of the driving unit 2 is adapted to be sleeved on and drive the polygonal rod 642 to rotate, thereby driving the abutment portion 641 of the adjusting unit 64 to move along the axis (L). In this embodiment, the polygonal rod 642 is a hexagonal rod, and the sleeve 221 is internal hexagonal and is removably sleeved on the polygonal rod 642. Then, the calibration motor 42 is controlled by the control module 54 to drive the calibration member 41 to extend into the calibration hole 612 and engage the engaging hole 659 formed in the threaded rod 654. When the rotating member 31 exerts a torque on the head portion 631 of the torsion member 63 to drive rotation thereof, a direction of the torque exerted on the first link rod 652 is opposite to the direction depicted by the arrow shown in FIG. 4. It should be noted that, in a case where the torque exerted by the rotating member 31 is smaller than the actual torque value of the torque wrench 6, the first link rod 652 will not be rotated.

Figure 5:
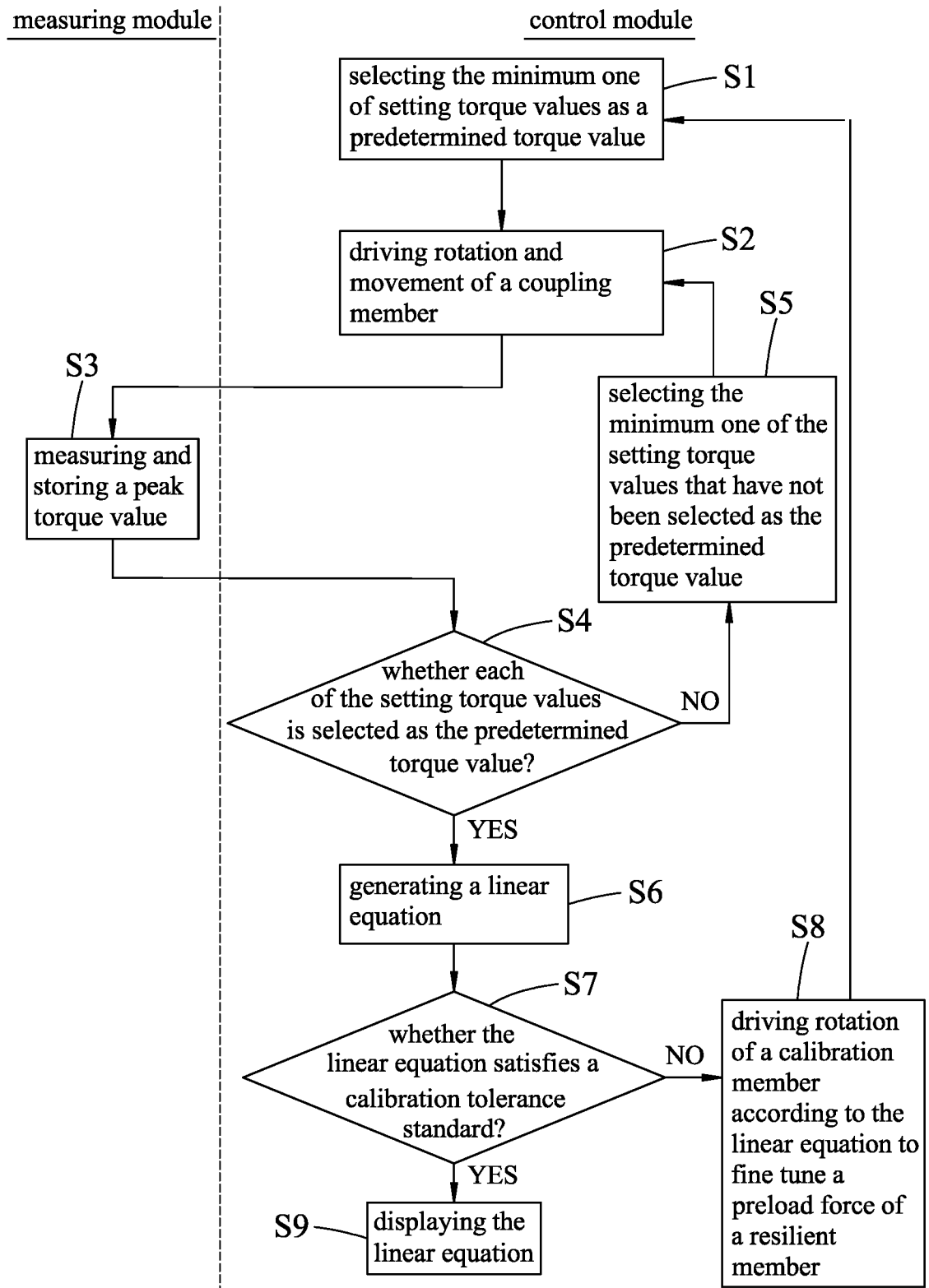
FIG. 5 is a flowchart illustrating a method for adjusting a torque of the torque wrench conducted by the first embodiment.

Referring to FIG. 5, a method for adjusting a torque of the torque wrench 6 to be conducted by the adjustment device of the first embodiment of the present disclosure is shown and includes steps S1 to S9.

In step S1, the control module 54 selects a minimum one of the setting torque values stored in the storage module 53 to be the predetermined torque value.

In step S2, the control module 54 controls the driving motor 21 to drive rotation of the coupling member 22 about the axis (L) for driving the polygonal rod 642 of the adjusting unit 64 to rotate about the axis (L), so the adjusting unit 64 is moved relative to the shank body 61 along the axis (L) to a position where the torque of the torque wrench 6 corresponds to the predetermined torque value.

In step S3, the control module 54 controls the torque-exerting motor 32 to drive rotation of the rotating member 31 to exert a torque on the head portion 631 of the torsion member 63 and to drive rotation of the head portion 631, and the measuring module 33 measures a peak torque value exerted by the rotating member 31 when the value of the torque exerted by the rotating member 31 is larger than an actual torque of the torque wrench 6. At this time, the control module 54 receives the peak torque value from the measuring module 33 and transmits the peak torque value to be stored in the storage module 53, and then the control module 54 controls the torque-exerting motor 32 to stop driving the rotating member 31 to thereby release the torsion member 63.

In step S4, the control module 54 determines whether each of the setting torque values stored in the storage module 53 is selected as the predetermined torque value. When the determination is affirmative, the flow of the method proceeds to step S6, otherwise the flow goes to step S5.

In step S5, the control module 54 selects the minimum one of the setting torque values that has not been selected as the predetermined torque value and the flow of the method goes back to step S2.

When the control module 54 determines that each of the setting torque values stored in the storage module 53 is selected as the predetermined torque value, step S6 is performed. In step S6, the control module 54 generates a linear equation according to the predetermined torque value and the peak torque value obtained from step S3 corresponding to each of the setting torque values stored in the storage module 53 and then the flow of the method goes to step S7. For example, in this embodiment, the linear equation is expressed as Y=aX+b, where X and Y respectively represent the peak torque value and the predetermined torque value corresponding to a selected one of the setting torque values, and a and b represents an upper limit and a lower limit of a calibration tolerance.

In step S7, the control module 54 determines whether the linear equation satisfies a calibration tolerance standard, and the flow of method proceeds to step S9 when affirmative, otherwise step S8 is performed. For example, the control module 54 determines that the linear equation satisfies the calibration tolerance standard when a is greater than 0, and b is greater than 0 and smaller than 1. In a case where a is equal to 1 and b is equal to 0, X is equal to Y. It should be noted that a range of the calibration tolerance may be modified as required, and the main feature of the present disclosure does not reside in the determination made in step S7, further details of the same are omitted for the sake of brevity.

In step S8, the control module 54 controls the calibration motor 42 to drive rotation of the calibration member 41 and thus the threaded rod 654 according to the linear equation to fine tune the preload force of the resilient member 62 and thus the torque of the torque wrench 6, then the flow of the method goes back to step S1. It should be noted that how the control module 54 controls the calibration motor 42 according to the linear equation is well known in the pertinent art and is not the salient feature of the present disclosure. Therefore, further details elaborating the same are omitted for the sake of brevity.

In step S9, the control module 54 controls the display module 51 to display the linear equation.

It should be noted that in one embodiment of the present disclosure, the control module 54 controls the display module 51, in steps S1 to S6, to display the information of the predetermined torque value corresponding to the selected one of the setting torque values, the peak torque value, and the linear equation for the user to refer to or record in real time.

In this embodiment, the number of the to-be-measured torque values is three and the to-be-measured torque values are respectively, e.g., 20 Nm, 60 Nm, and 100 Nm. The storage module 53 stores a conversion equation related to the number of rotation of the abutment portion 641 corresponding to a variation in the torque of the torque wrench 6. Thus, the control unit 5 controls the driving motor 21 to rotate the abutment portion 641 for a certain number of turns according to the conversion equation so as to move the abutment portion 641 to a position where the torque of the torque wrench 6 corresponds to the predetermined torque value, i.e., the selected one of the setting torque values. In other embodiments of the present disclosure, when another torque wrench having a torque different from that of the torque wrench 6 is to be adjusted, another conversion equation related to the number of rotation corresponding to a variation in the torque of another torque wrench is stored in the storage module 53. It should be noted that, the number of the to-be-measured torque values may be modified to be two or more than four and the present disclosure is not limited thereto.

Figure 6:
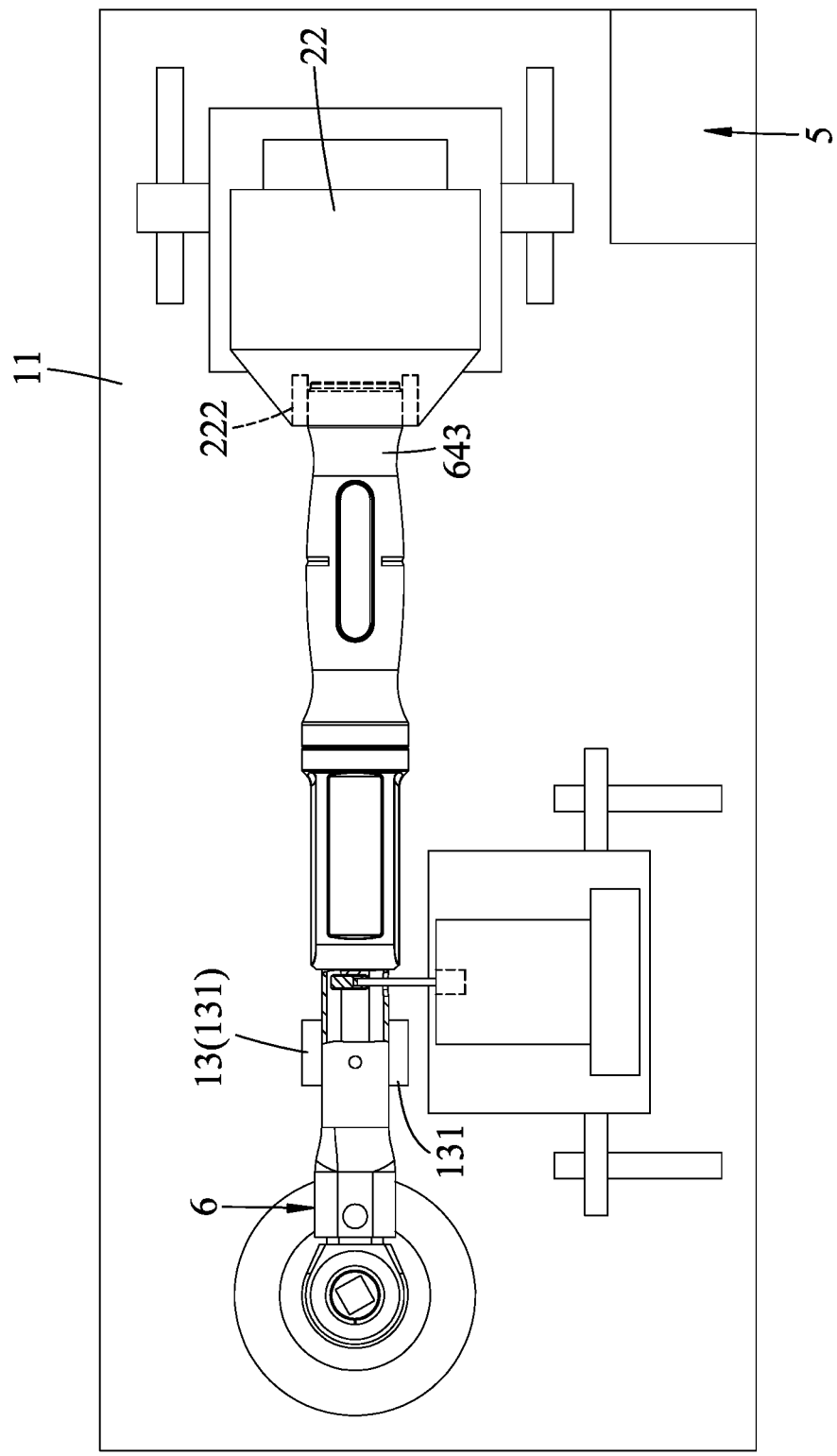
FIG. 6 is a schematic view illustrating the torque wrench being mounted on an adjustment device according to a second embodiment of the present disclosure.

Referring to FIG. 6, the adjustment device of a second embodiment according to the present disclosure is similar to the first embodiment, and the differences between the first embodiment and the second embodiment reside in the following. In the second embodiment, the coupling member 22 includes a fastening portion 222 adapted to be fixedly connected to and drive the handle portion 643 of the adjusting unit 64 to rotate, thereby driving the abutment portion 641 of the adjusting unit 64, which is co-rotatably connected to the handle portion 643, which threadedly engages the shank body 61, and which abuts against the resilient member 62, to move along the axis (L). In this embodiment, it is not required to remove the handle 643 when mounting the torque wrench 6 on the frame seat 11 of the base unit 1.

In summary, in the adjustment device of the present disclosure, by virtue of the driving motor 21 that drives rotation and thus movement of the adjusting unit 64 along the axis (L), a process of manually rotating the handle 643 to adjust the torque of the torque wrench 6 may be omitted. Furthermore, the calibration unit 4 is controlled by the control module 54 to fine tune the preload force of the resilient member 62 and thus the torque wrench 6, so calibration of the torque wrench 6 may be completed in a relatively simple manner. In addition, by virtue of the restoring member 43 that biases the calibrating member 41 away from the calibrating motor 42, the calibrating member 41 engages the engaging hole 659 at all time, and removal of the calibration member 41 from the engaging hole 659 during rotation of the rotating member 31 that drives rotation of the torsion member 63 to drive pivot movement of the first link rod 652 may be prevented.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An adjustment device for adjusting a torque of a torque wrench, the torque wrench including a shank body that extends along an axis and that defines an accommodating space therein, a torsion member and an adjusting unit that are disposed at two opposite ends of the shank body along the axis, and a resilient member that is disposed in the accommodating space and clamped between the torsion member and the adjusting unit, the adjusting unit threadedly engaging the shank body and rotatable about the axis so as to be movable relative to the shank body along the axis to vary a preload force of the resilient member and thus a torque of the torque wrench, said adjustment device comprising:
   a base unit that includes
     a frame seat adapted for mounting of the torque wrench thereon, and
     a positioning member disposed on said frame seat and adapted for positioning the shank body;
   a driving unit that includes
     a coupling member adapted to be removably connected to the adjusting unit, and
     a driving motor mounted movably to said frame seat, and operable for driving said coupling member to rotate about the axis for driving the adjusting unit to rotate about the axis; and
   a control unit that is electrically connected to said driving motor, and that is configured to control said driving motor to drive rotation of said coupling member about the axis for driving rotation of the adjusting unit to thereby move the adjusting unit along the axis to a position where the torque of the torque wrench corresponds to a predetermined torque value.

2. The adjustment device as claimed in claim 1, further comprising a force applying unit that includes:
   a rotating member rotatably mounted on said frame seat, and adapted for engaging the torsion member and exerting a torque on the torsion member to drive rotation of the torsion member;
   a torque-exerting motor mounted on said frame seat for driving rotation of said rotating member; and
   a measuring module mounted to said rotating member and configured to measure a peak torque value exerted by said rotating member when the value of the torque exerted by said rotating member is greater than an actual torque value of the torque wrench.

3. The adjustment device as claimed in claim 2, wherein said control unit includes:
   a control module electrically connected to said measuring module, said torque-exerting motor, and said driving motor, and configured to control operations of said driving motor and said torque-exerting motor; and
   a storage module electrically connected to said control module and storing a plurality of setting torque values including the predetermined torque value, said control module being configured to receive the peak torque value and transmit the peak torque value to be stored in said storage module.

4. The adjustment device as claimed in claim 1, wherein said coupling member of said driving unit includes a sleeve adapted to be sleeved on and drive a polygonal rod of the adjusting unit to rotate, thereby driving an abutment portion of the adjusting unit, which is co-rotatably connected to the polygonal rod, which threadedly engages the shank body, and which abuts against the resilient member, to move along the axis.

5. The adjustment device as claimed in claim 1, wherein said coupling member of said driving unit includes a fastening portion adapted to be fixedly connected to and drive a handle portion of the adjusting unit to rotate, thereby driving an abutment portion of the adjusting unit, which is co-rotatably connected to the handle portion, which threadedly engages the shank body, and which abuts against the resilient member, to move along the axis.

6. The adjustment device as claimed in claim 1, wherein said positioning member includes two clamping portions adapted to clamp the shank body therebetween.

7. The adjustment device as claimed in claim 1, further comprising a calibration unit that includes a calibration member adapted to extend into a calibration hole that is formed in the shank body and that is in spatial communication with the accommodating space, said calibration member being further adapted to be connected to an articulate rod module of the torque wrench, said calibration member being rotatable in a first rotational direction for expanding the articulate rod module to compress the resilient member, and being rotatable in a second rotational direction opposite to the first rotational direction for shrinking the articulate rod module to release the resilient member, thereby varying the preload force of the resilient member.

8. The adjustment device as claimed in claim 7, wherein said calibration unit further includes a calibrating motor disposed on said frame seat, electrically connected to the control unit, and operable for driving rotation of said calibration member.

9. The adjustment device as claimed in claim 8, wherein said calibration unit further includes a restoring member connected between said calibrating member and said calibrating motor for resiliently biasing said calibrating member away from said calibrating motor.

\* \* \* \* \*